US009946398B2

(12) United States Patent
De Araujo et al.

(10) Patent No.: US 9,946,398 B2
(45) Date of Patent: Apr. 17, 2018

(54) SYSTEM AND METHOD FOR TIMING INPUT SENSING, RENDERING, AND DISPLAY TO MINIMIZE LATENCY

(71) Applicant: Tactual Labs Co., New York, NY (US)

(72) Inventors: Bruno Rodrigues De Araujo, Toronto (CA); Ricardo Jorge Jota Costa, Toronto (CA); Clifton Forlines, South Portland, ME (US)

(73) Assignee: Tactual Labs Co., New York, NY (US)

( * ) Notice: Subject to any disclaimer, the term of this patent is extended or adjusted under 35 U.S.C. 154(b) by 0 days.

(21) Appl. No.: 15/423,094

(22) Filed: Feb. 2, 2017

(65) Prior Publication Data

US 2017/0235411 A1 Aug. 17, 2017

Related U.S. Application Data

(63) Continuation-in-part of application No. 14/945,083, filed on Nov. 18, 2015.

(60) Provisional application No. 62/290,347, filed on Feb. 2, 2016, provisional application No. 62/081,261, filed on Nov. 18, 2014.

(51) Int. Cl.
*G06F 3/041* (2006.01)
*G09G 5/395* (2006.01)
*G09G 5/00* (2006.01)

(52) U.S. Cl.
CPC ........... *G06F 3/0416* (2013.01); *G09G 5/006* (2013.01); *G09G 2320/0252* (2013.01); *G09G 2354/00* (2013.01)

(58) Field of Classification Search
None
See application file for complete search history.

(56) References Cited

U.S. PATENT DOCUMENTS

2014/0092150 A1* 4/2014 Slavenburg ............ G09G 5/001 345/698
2015/0062021 A1* 3/2015 Skaljak ............... G06F 3/04883 345/173
2016/0247484 A1* 8/2016 Chen ...................... G09G 5/399

* cited by examiner

*Primary Examiner* — Joseph Haley
*Assistant Examiner* — Emily Frank
(74) *Attorney, Agent, or Firm* — Adam B. Landa

(57) ABSTRACT

The disclosed systems and methods relate in general to the field of user input to a touch sensitive device, and in particular to user input systems and methods which can reduce the latency between a most recent input event and the displaying of a rendered frame reflecting such input. In an embodiment, a method for decreasing latency between an input touch event and the display of a frame reflecting the input touch event in a touch sensitive device includes estimating the time of a next frame refresh, receiving from the operating system touch data reflective of an input touch event, determining the application associated with the input touch event, estimating the time it will take the application to process and render the received touch data, determining a time at which delivery of the touch data to the application will permit the application to process and render the touch data prior to the time of the next frame refresh, based at least in part on the estimated time it will take the application to process and render the touch data, and the estimated time of the next frame refresh, and providing the touch data to the application just prior to the determined time.

2 Claims, 4 Drawing Sheets

SYSTEM AND METHOD FOR TIMING INPUT SENSING, RENDERING, AND DISPLAY TO MINIMIZE LATENCY

CROSS-REFERENCE TO RELATED APPLICATIONS

This application is also a non-provisional of, and claims priority to, U.S. Provisional Patent Application No. 62/290,347 filed Feb. 2, 2016, the entire disclosure of which is incorporated herein by reference. This application is a continuation-in-part of, and claims priority to, U.S. patent application Ser. No. 14/945,083 filed Nov. 18, 2015, the entire disclosure of which is incorporated herein by reference, which itself is a non-provisional of and claims priority to U.S. patent application Ser. No. 62/081,261 filed Nov. 18, 2014. This application includes material which is subject to copyright protection. The copyright owner has no objection to the facsimile reproduction by anyone of the patent disclosure, as it appears in the Patent and Trademark Office files or records, but otherwise reserves all copyright rights whatsoever.

FIELD

The disclosed systems and methods relate in general to the field of user input to a touch sensitive device, and in particular to user input systems and methods which can reduce the latency between a most recent input event and the displaying of a rendered frame reflecting such input.

BRIEF DESCRIPTION OF THE DRAWINGS

The foregoing and other objects, features, and advantages of the invention will be apparent from the following more particular description of preferred embodiments as illustrated in the accompanying drawings, in which reference characters refer to the same parts throughout the various views. The drawings are not necessarily to scale, emphasis instead being placed upon illustrating principles of the invention.

DETAILED DESCRIPTION

Figure 1:
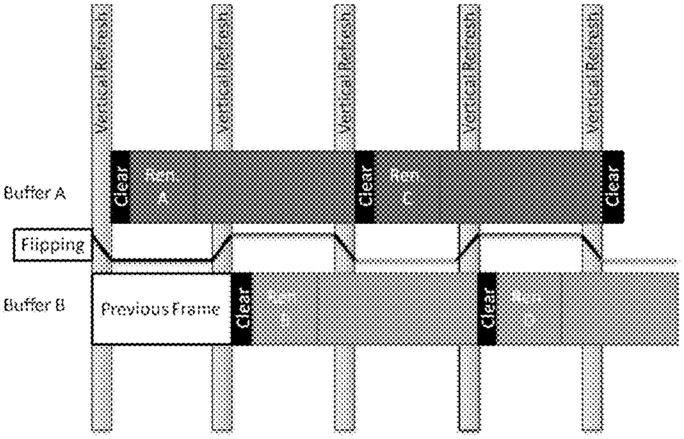
FIG. 1 shows a diagram illustrating a prior double-buffered solution.

Reference will now be made in detail to the preferred embodiments of the present invention, examples of which are illustrated in the accompanying drawings. The following description and drawings are illustrative and are not to be construed as limiting. Numerous specific details are described to provide a thorough understanding. However, in certain instances, well-known or conventional details are not described in order to avoid obscuring the description. References to one or an embodiment in the present disclosure are not necessarily references to the same embodiment; and, such references mean at least one.

Reference in this specification to "an embodiment" or "the embodiment" means that a particular feature, structure, or characteristic described in connection with the embodiment is included in at least an embodiment of the disclosure. The appearances of the phrase "in an embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The present invention is described below with reference to block diagrams and operational illustrations of methods and devices for timing input sensing, rendering and display to minimize latency. It is understood that each block of the block diagrams or operational illustrations, and combinations of blocks in the block diagrams or operational illustrations, may be implemented by means of analog or digital hardware and computer program instructions. These computer program instructions may be stored on computer-readable media and provided to a processor of a general purpose computer, special purpose computer, ASIC, or other programmable data processing apparatus, such that the instructions, which execute via the processor of the computer or other programmable data processing apparatus, implements the functions/acts specified in the block diagrams or operational block or blocks. In some alternate implementations, the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved.

Interactive devices can be seen as a composition of multiple parts, including input sensory, processing and rendering tasks, and output display. The pipeline required to convert input sensory (e.g.: finger touch) into a visual response is not immediate; each action introduces latency for numerous reasons, such as time required to process information or, in the case of displays, frequency that the display uses to re-draw its entire screen, or parts of thereof. As such, even if these actions work in parallel, when possible, a system is only as fast as the slowest of the actions. For example, displays may only refresh once every 60 Hz, which means that, if everything else is faster (or available) before the next refresh cycle, the system is forced to wait for the display to be ready to display the new information.

It is an object of the present invention to reduce the latency (that is, the time between the user's input to the system and the system's graphical response to that input). It is also an object to enable the most recent input information to be displayed, by synchronizing the input capture and processing with the display refresh. Currently, any input information is processed as soon as possible and often is left waiting for the next refresh cycle. This alone introduces a wait period and is reflected in the overall system latency. In accordance with an embodiment of the presently disclosed methods, the system considers when the next refresh will be and takes that into account to provide the most up-to-date events, just in time for rendering.

In an embodiment, the time to refresh the display and the time required to sample the input sensor and compute the touch point are known. Thus, the input sensing is delayed to coincide to end when the refresh is about to start. In an embodiment, the rendering is started at the last possible moment so that it completes and the output is ready for the next display refresh. This just-in-time rendering will have access to the most recent input events; thus, the resulting display will include graphics with minimum amounts of latency.

In another embodiment, the time to refresh or the time to sample the input sensor are not known a priori and require measurements. Measurements are executed based on key timestamps, and this allows us to ensure temporal ordering and sequencing. Through measuring, the input sample rate and display refresh rate become known, and the rendering of the graphics can be timed as outlined above in order to minimize latency.

In another embodiment such measurements are detected using external measure paraphernalia and user-input (or defined as constants).

In another embodiment, these measures vary according to system workload and measures are not precise, but mere attempts to reduce the wait for the display. The time required to render the output is a function of the complexity of the output and competing system activities (more complex outputs generally require more time to render, competing activities on the CPU or GPU can slow down rendering, and so on). In this embodiment, the system estimates the rendering time based on some combination of: models of the output complexity; knowledge of competing activities on key system components; the time required to render previous frames; and, the time required to render similar outputs in the past.

In another embodiment, the system renders the output as soon as the display completes its vertical refresh and the appropriate buffer is available to render into. After rendering is complete, and until the next vertical refresh, the system updates this rendering based on additional input event samples by the input sensor. For example, the system might render a view of a GUI and then translate it based on additional input events until such a time as the rendering must be displayed.

FIG. 1 shows a prior double-buffered solution. In such a solution, the display "flips" or "swaps" between two buffers which are used for display and rendering (A & B). When Buffer A is visible, the device renders into Buffer B. At a pre-determined rate, the system flips/swaps the buffers so that B is now visible and A can be rendered into. When a Buffer is offscreen, it is cleared and rendered into.

Figure 2:
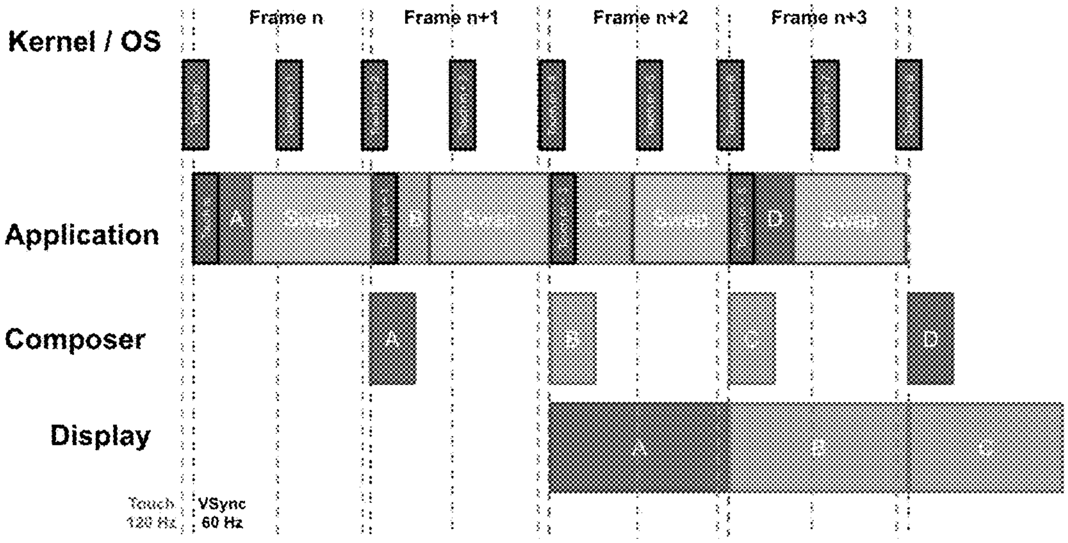
FIGS. 2 and 3 show diagrams illustrating prior methods of rendering.
Figure 3:
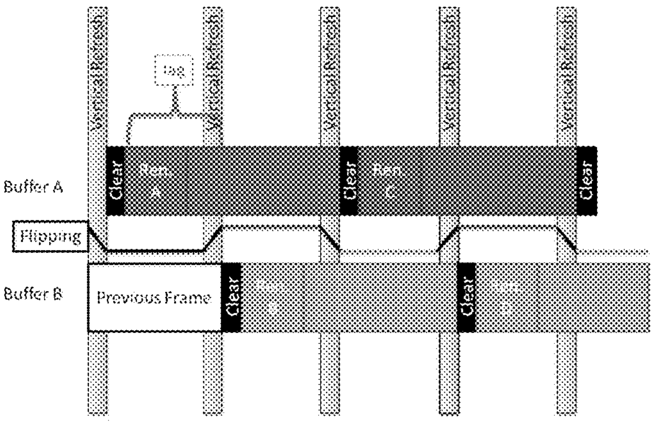

FIGS. 2 and 3 show a prior method of rendering. The GUI is rendered using the most recent input data and application state. Latency (lag) occurs when there is a difference between the application state (including input) when the GUI is rendered and when it's finally displayed on screen. In FIG. 3, the lag of rendering A is shown as the time between the start of rendering A and the vertical refresh that displays the result of rendering A on the screen.

Figure 4:
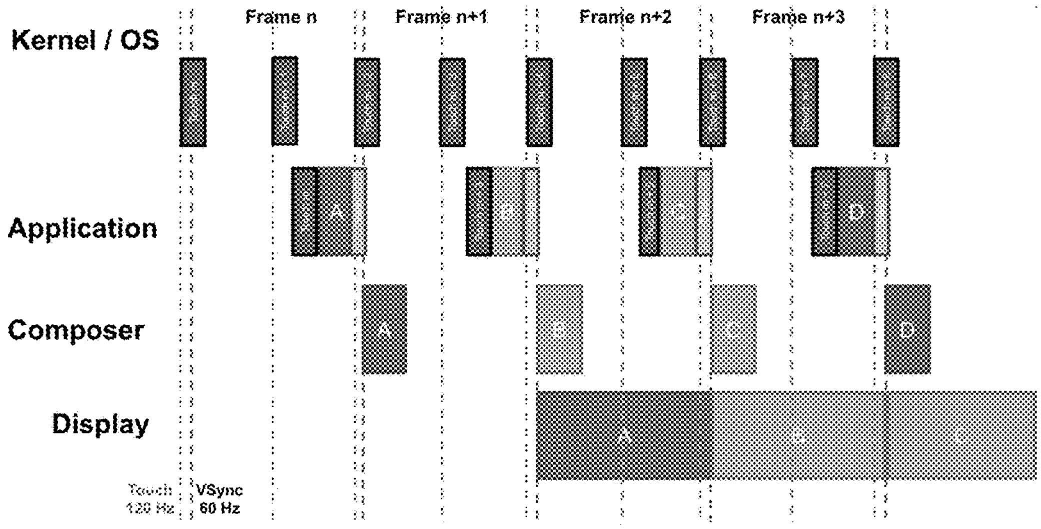
FIGS. 4 and 5 show diagrams illustrating embodiments of a solution to reduce lag by rendering faster and refreshing the screen faster.
Figure 5:
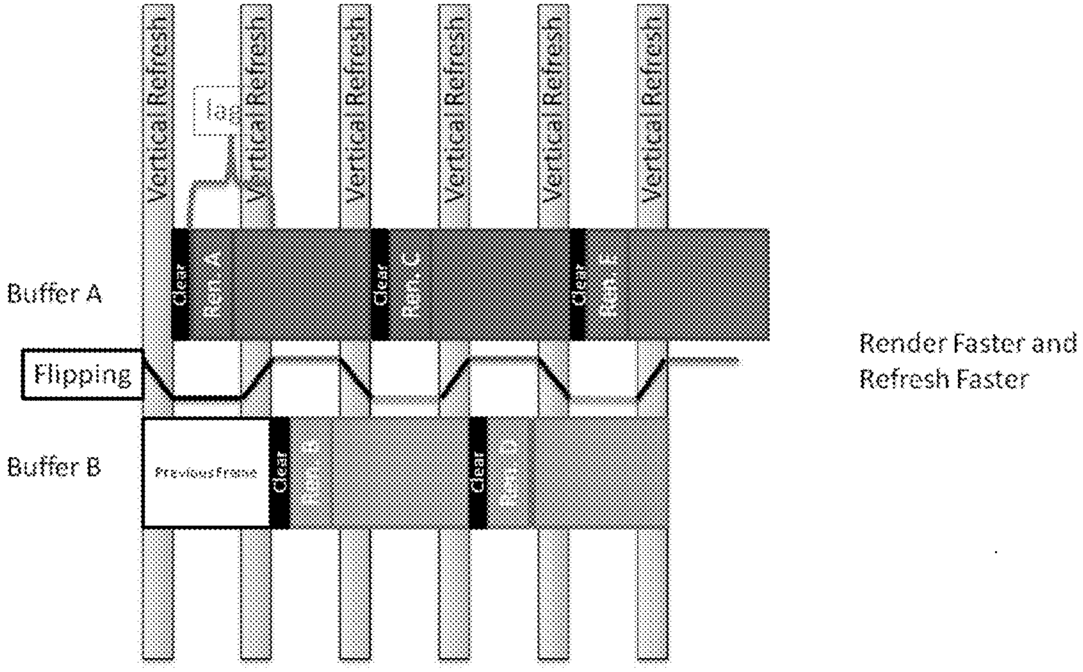

FIGS. 4 and 5 show embodiments of a solution to reduce lag by rendering faster and refreshing the screen faster. For example, one might include a faster GPU in their system or other such improvements, and may run their display at a faster refresh rate (say 100 Hz rather than 60 Hz). In this manner, the rendered graphics are both created faster and display faster on-screen to the user, thus reducing the time between the start of rendering and the display of the GUI to the user. As long as there is time to clear the buffer and render the GUI between vertical refreshes of the screen, this approach will reduce lag at the expense of more capable rendering engines and faster more expensive displays.

Figure 6:
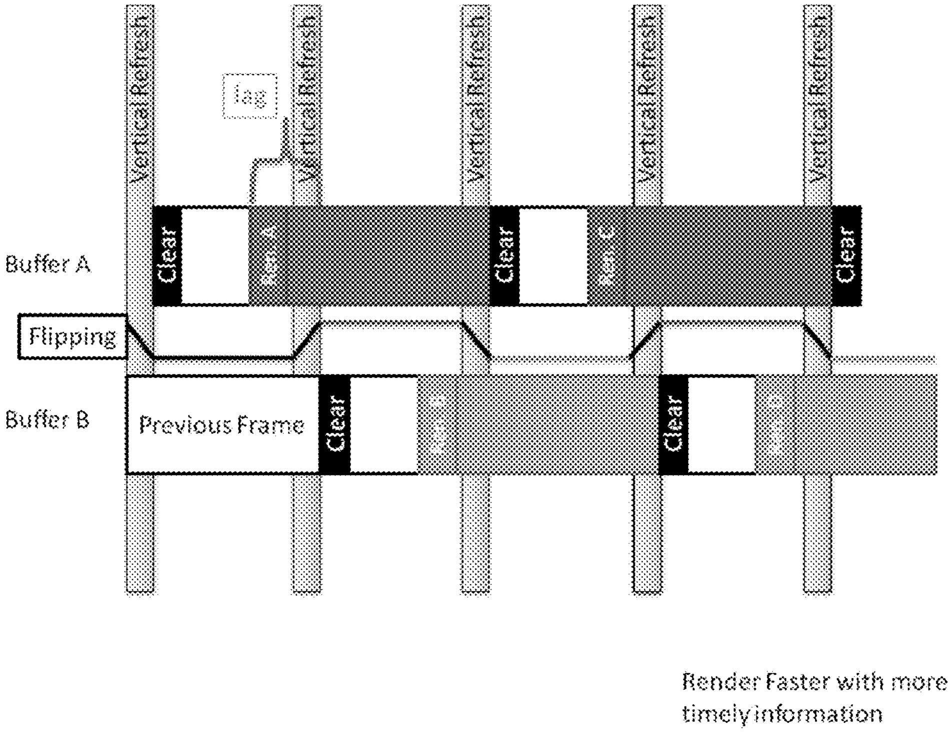
FIG. 6 shows a diagram illustrating an embodiment of the presently disclosed system and method in which a system is provided that times the rendering of the GUI.

FIG. 6 shows an embodiment of the disclosed system and method wherein the rendering of the GUI is timed so that it finishes as close to the vertical refresh as possible. In this manner, the rendering can use the most recently available input from the user and most recently available application state to produce the rendered image, thus reducing lag.

In an embodiment, a system and method are provided for decreasing latency between an acquisition of touch data and processing of an associated rendering task in a touch sensitive device having a touch sensing system capable of producing touch data at a touch sampling rate and having a display system that displays frames at a refresh rate. The system estimates at least one of (a) a period of time for sampling touch data from the touch sensing system, (b) a period of time for computing touch event data from sampled touch data, and (c) a period of time for rendering of a frame to a frame buffer. The system determines a period of time Tc for (a) sampling touch data from the touch sensing system, (b) computing touch event data from sampled touch data, and (c) rendering of a frame to a frame buffer, based at least in part on the estimate. The system determines a point in time Tr at which the display system will be refreshed from the frame buffer. A sampling start time is computed based at least in part upon Tr and Tc. Sampling of the touch sensing system is initiated to obtain sampled touch data at the sampling start time. Touch event data is computed from the sampled touch data, and a frame that reflects the touch event data is rendered to the frame buffer prior to the time Tr. The display is then refreshed from the frame buffer.

In an embodiment, the system determines a period of time Tc required to compute touch event data from sampled touch data and render a frame to a frame buffer and a point in time Tr at which the display system will be refreshed from the frame buffer. The touch sensing system is sampled to create sampled touch data. Touch event data is computed from the sampled touch data, and the beginning of this computing step is delayed to occur at a point in time that is at least as early as (Tr−Tc). A frame is rendered to the frame buffer prior to the point in time Tr, and the display system is then refreshed from the frame buffer.

In an embodiment, a method is provided for decreasing latency between an acquisition of touch data and processing of an associated rendering task in a touch sensitive device having (a) a touch sensing system capable of producing touch data a touch sampling rate and having a sampling sync, and (b) a display system that displays frames at a refresh rate having a refresh sync. Sampling of touch sensor output is commenced on a sampling sync and sampled output is placed in a sampling buffer at a sampling rate. Frame rendering to one of a plurality of display buffers is commenced on a refresh sync, and display images corresponding to a rendered frame are displayed on a refresh sync. A period of time Tc corresponding to an estimated time for collecting the output in the sampling buffer is determined, a period of time Tm corresponding to an estimated time for computing touch event data from collected output is determined, and a period of time Tr corresponding to an estimated time for rendering of a frame corresponding to the touch event data is determined. A start time is computed based upon the refresh sync, Tc, Tm and Tr, and collecting of the output in the sampling buffer is initiated at the start time. Thereafter, touch event data is computed from collected output and a frame corresponding to the touch event data is rendered.

In an embodiment, the swap buffer duration may be used to estimate when an image rendered by the application is ready to be presented by the display. In an embodiment, alternative strategies for estimating the image availability may be employed; for example, without limitation, an alternative strategy for estimating the image availability may include monitoring of a buffer-based abstraction of the frame buffer (e.g. a queue, dual buffer, triple-buffer, (or any multi-buffer strategy) stack, hash, heap, linked list, doubly-linked list, etc.). In an embodiment, an application can be provided with an API that allows it to specify the time required to perform a render, for example by indicating a render start and a render end. In an embodiment, a random period of time may be chosen as an estimate the period of rendering.

In an embodiment, estimates of input sampling and/or output processing are used to adjust scheduling; thus, for example, the amount of time taken by various processes within a system may be monitored, and the scheduling of input sampling and/or output processing may be adjusted to compensate for that time. In an embodiment, multiple overlapping schedules may exist, with multiple candidate outputs generated and a correct one chosen given a particular amount of time taken to perform rendering or otherwise process an input. In an embodiment, one or more of the following may be monitored: sampling time, computing time (of one or more of the operating system, UI framework, application, or other process), rendering, the time required for the hardware to render a given input, and the time required to deliver an input to the application. In an embodiment, time taken by, e.g., the operating system for input and output processing can be monitored and fed to a scheduler.

In an embodiment, the latency of the system is improved by scheduling the processing of input and the display of its effects on the screen. Such may be desirable when, e.g., an operating system is leveraged in native mode, and no access is natively provided for insertion at the render. For a given duration of a processing step, improved latency may be achieved by scheduling that processing to take place after a particular input, or before a particular refresh of the display (or on a recurring, pre-determined or continuously adjusted schedule with respect to the input or display). In an embodiment, output and/or input events might be skipped. In an embodiment, input events from several input frames are be packed together by the scheduling process to be delivered to the application.

As discussed, scheduling is performed to determine when the rendering of an application's view should take place. In an embodiment, scheduling of when the input delivery to the application is conducted and which sampled input should be included is considered, to ensure that the most recent input is the one which is processed and whose effects are shown on the screen. In an embodiment, scheduling of input is conducted. In an embodiment, scheduling of output is conducted. In an embodiment, both are conducted. Thus, in an embodiment, an operating system forwards event data (e.g., touch event data) to a process that consolidates and schedules the delivery of the event data to the application. In an embodiment, the process may consolidate of multiple events, including events from a plurality of sensors (which may or may not run and similar sampling rates). In an embodiment, scheduling the delivery to the application may be based on the input processing and output processing time for the consolidated events. In an embodiment, where the consolidated events are determined to exceed the available time left until a frame buffer switch, the delivery of the events may be deferred until a point prior to the subsequent frame buffer switch (e.g., just prior to the subsequent frame buffer switch), but will nonetheless include the most recent information when delivered. In an embodiment, where the consolidated events are determined to exceed the available time left until a frame buffer switch, one or more of the consolidated events may be skipped, and thus the input decimated to permit display on the frame buffer switch.

In an embodiment, simultaneous (or near simultaneous) processing of multiple input samples may be performed. Such processing allows the decoupling of the input sampling from the scheduling process. Thus, in an embodiment, multiple samples of input are taken. When the time has come for an input to be processed for modifying the application state, that most recent event is sent to the application to update its state. In an embodiment, to mitigate time by an application updating its state multiple times between output frames, the application may be apprised of input only when it is appropriate for it to perform an update (and render). While this strategy is effective in reducing latency by only rendering the most recent event, it is possible that the skipped events might contain needed or desired information. Thus, in an embodiment, input events are queued (or otherwise packed/grouped) and delivered as a group to the application (or otherwise processed simultaneously or near simultaneously), thus reducing the number of times an application updates its state. Such delivery of input events reduces the number of updates occurring, increases the likelihood that the input events are delivered at the correct time for a particular output method/process. Further, applications may thus receive the same (or largely the same) input as they would otherwise without the benefit of this queueing.

Throughout this disclosure, the terms "touch", "touches," or other descriptors may be used to describe events or periods of time in which a user's finger, a stylus, an object or a body part is detected by the sensor. In some embodiments, these detections occur only when the user is in physical contact with a sensor, or a device in which it is embodied. In other embodiments, the sensor may be tuned to allow the detection of "touches" that are hovering a distance above the touch surface or otherwise separated from the touch sensitive device. Therefore, the use of language within this description that implies reliance upon sensed physical contact should not be taken to mean that the techniques described apply only to those embodiments; indeed, nearly all, if not all, of what is described herein would apply equally to "touch" and "hover" sensors. As used herein, the phrase "touch event" and the word "touch" when used as a noun include a near touch and a near touch event, or any other gesture that can be identified using a sensor.

At least some aspects disclosed can be embodied, at least in part, in software. That is, the techniques may be carried out in a special purpose or general purpose computer system or other data processing system in response to its processor, such as a microprocessor, executing sequences of instructions contained in a memory, such as ROM, volatile RAM, non-volatile memory, cache or a remote storage device.

Routines executed to implement the embodiments may be implemented as part of an operating system, firmware, ROM, middleware, service delivery platform, SDK (Software Development Kit) component, web services, or other specific application, component, program, object, module or sequence of instructions referred to as "computer programs." Invocation interfaces to these routines can be exposed to a software development community as an API (Application Programming Interface). The computer programs typically comprise one or more instructions set at various times in various memory and storage devices in a computer, and that, when read and executed by one or more processors in a computer, cause the computer to perform operations necessary to execute elements involving the various aspects.

A machine-readable medium can be used to store software and data which when executed by a data processing system causes the system to perform various methods. The executable software and data may be stored in various places including for example ROM, volatile RAM, non-volatile memory and/or cache. Portions of this software and/or data may be stored in any one of these storage devices. Further, the data and instructions can be obtained from centralized servers or peer-to-peer networks. Different portions of the data and instructions can be obtained from different centralized servers and/or peer-to-peer networks at different times and in different communication sessions or in a same communication session. The data and instructions can be obtained in their entirety prior to the execution of the applications. Alternatively, portions of the data and instructions can be obtained dynamically, just in time, when needed for execution. Thus, it is not required that the data and instructions be on a machine-readable medium in entirety at a particular instance of time.

Examples of computer-readable media include but are not limited to recordable and non-recordable type media such as volatile and non-volatile memory devices, read only memory (ROM), random access memory (RAM), flash memory devices, floppy and other removable disks, magnetic disk storage media, optical storage media (e.g., Compact Disk Read-Only Memory (CD ROMS), Digital Versatile Disks (DVDs), etc.), among others.

In general, a machine readable medium includes any mechanism that provides (e.g., stores) information in a form accessible by a machine (e.g., a computer, network device, personal digital assistant, manufacturing tool, any device with a set of one or more processors, etc.).

In various embodiments, hardwired circuitry may be used in combination with software instructions to implement the techniques. Thus, the techniques are neither limited to any specific combination of hardware circuitry and software nor to any particular source for the instructions executed by the data processing system.

The above embodiments and preferences are illustrative of the present invention. It is neither necessary, nor intended for this patent to outline or define every possible combination or embodiment. The inventor has disclosed sufficient information to permit one skilled in the art to practice at least one embodiment of the invention. The above description and drawings are merely illustrative of the present invention and that changes in components, structure and procedure are possible without departing from the scope of the present invention as defined in the following claims. For example, elements and/or steps described above and/or in the following claims in a particular order may be practiced in a different order without departing from the invention. Thus, while the invention has been particularly shown and described with reference to embodiments thereof, it will be understood by those skilled in the art that various changes in form and details may be made therein without departing from the spirit and scope of the invention.

What is claimed is:

1. A method for decreasing latency between an input touch event and the display of a frame reflecting the input touch event in a touch sensitive device having an operating system operatively connected to a touch sensing system sensitive to an input touch event and a display system, the display system displaying frames at a periodic refresh rate, the method comprising:

estimating the time of a next frame refresh;

receiving from the operating system touch data reflective of an input touch event;

determining the application associated with the input touch event;

estimating the time it will take the application to process and render the received touch data;

determining a time at which delivery of the touch data to the application will permit the application to process and render the touch data prior to the time of the next frame refresh, based at least in part on the estimated time it will take the application to process and render the touch data, and the estimated time of the next frame refresh; and providing the touch data to the application just prior to the determined time.

2. A method for decreasing latency between a latest input touch event and the display of a frame reflecting the input touch event in a touch sensitive device having an operating system operatively connected to a touch sensing system sensitive to an input touch event and a display system, the display system displaying frames at a periodic refresh rate, the method comprising:

estimating the time of a next frame refresh;

receiving from the operating system touch data reflective of a plurality of input touch events associated with a first application;

estimating the time it will take the application to process and render the plurality of input touch events in the received touch data;

determining a time at which delivery of the touch data to the application will permit the application to process and render the touch data prior to the time of the next frame refresh, based at least in part on the estimated time it will take the application to process and render the touch data, and the estimated time of the next frame refresh; and providing the touch data to the application just prior to the determined time.

* * * * *